United States Patent [19]

Neff

[11] 4,453,697

[45] Jun. 12, 1984

[54] REMOTE AIR OPERATOR FOR AN AIR VALVE, WITH MANUAL OVERRIDE AND INDICATOR

[75] Inventor: James A. Neff, Bloomfield Township, Oakland County, Mich.

[73] Assignee: MAC Valves, Inc., Wixom, Mich.

[21] Appl. No.: 353,046

[22] Filed: Mar. 1, 1982

[51] Int. Cl.$^3$ .................. F15B 13/042; F16K 31/122; F16K 31/143

[52] U.S. Cl. .......................................... 251/14; 92/84; 137/625.66; 251/63.4

[58] Field of Search ................. 91/391 R; 92/5 R, 84; 137/625.66; 251/14, 63.4, 63.6

[56] References Cited

U.S. PATENT DOCUMENTS

| | | | |
|---|---|---|---|
| 1,912,447 | 6/1933 | Gray | 251/63.4 |
| 2,371,815 | 3/1945 | Fitch | 92/84 |
| 3,506,035 | 4/1970 | Chabrier | 137/625.6 X |
| 3,530,897 | 9/1970 | Buchanan | 137/625.66 X |
| 3,734,455 | 5/1973 | Natho et al. | 251/14 X |
| 3,845,932 | 11/1974 | Fontaine | 251/63.4 |
| 3,980,270 | 9/1976 | Thomas | 251/14 X |
| 4,088,064 | 5/1978 | Tsunemoto et al. | 251/14 X |
| 4,306,586 | 12/1981 | Spencer | 251/14 X |
| 4,325,535 | 4/1982 | Foster | 92/5 R X |
| 4,372,333 | 2/1983 | Goans | 251/63.4 X |

FOREIGN PATENT DOCUMENTS

| | | | |
|---|---|---|---|
| 1120387 | 7/1956 | France | 251/63.6 |
| 1343747 | 10/1963 | France | 251/63.6 |

*Primary Examiner*—Gerald A. Michalsky
*Attorney, Agent, or Firm*—Robert G. Mentag

[57] ABSTRACT

A remote air operator for an air valve which includes a manual override and indicator means. The remote air operator includes a piston having an overtravel push pin which is adapted to be operated by an air pressure signal from a remote location. The push pin is adapted to directly engage the end of a valve spool and move the same from a first position to a second position. The push pin is slidably mounted in a remote control piston operated by the air pressure signal, and it is normally biased to an operative position by an overtravel spring. A second manual operator piston is slidably mounted in the remote operator piston and it is retained therein, and engages one end of the overtravel spring. A manual operator rod is attached to the manual operator piston to permit manual operation of the push pin to operate a valve spool.

5 Claims, 3 Drawing Figures

REMOTE AIR OPERATOR FOR AN AIR VALVE, WITH MANUAL OVERRIDE AND INDICATOR

TECHNICAL FIELD

This invention relates generally to the air valve art, and more particularly to an improved remote air operator for an air valve, which includes a manual override and indicator means. The valve of the present invention is adapted for use in operating an air valve, such as a pilot air valve, from a remote area where an electrical operator, such as a solenoid, cannot be used because of hazardous conditions in the remote area.

BACKGROUND ART

It is known in the art valve art to provide remote operators for air valves to control the operation of an air valve, such as a pilot air valve, or other type valves, which in turn control directional flow control valves, or the like. Various remote air and manual operators have been provided, but such operators incorporate expensive and inefficient operating structure. The prior art remote air operators are disadvantageous in that they employ direct air operated pistons and other structure which directly contact the poppet valve spool in a valve being operated, and such direct contact with the valve spool has been found to injure the poppet valve spool because of the direct force at high pressures that are applied to the poppet valve spool.

DISCLOSURE OF THE INVENTION

In accordance with the present invention, a remote air operator for an air valve is provided which includes a manual override and indicator means. The remote air operator includes a piston and an overtravel mechanism for operating a poppet valve spool in a pilot air valve, or the like, so that the poppet valve spool is not absorbing the total force of the air pressure signal impressed on the operator piston. The remote air operator of the present invention can be manually operated or initiated by another control valve, such as a hand operated valve, a palm button valve, a time valve, a limit switch valve, and the like. The remote air operator is provided with a visual indicator which permits the user of the remote air operator to visually see that the remote operator has functioned. The remote air operator of the present invention can be used in areas where hazardous conditions are present so that it is not possible to use any electrial operator as, for example, a solenoid.

BEST MODE OF CARRYING OUT THE INVENTION

Figure 1:
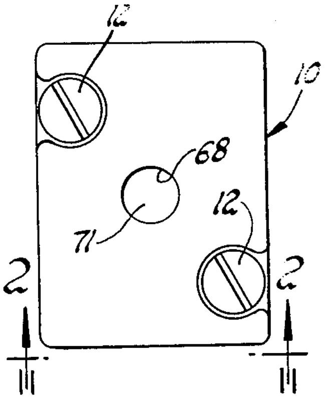
FIG. 1 is a top plan view of a remote air operator, for an air valve, made in accordance with the principles of the present invention.
Figure 2:
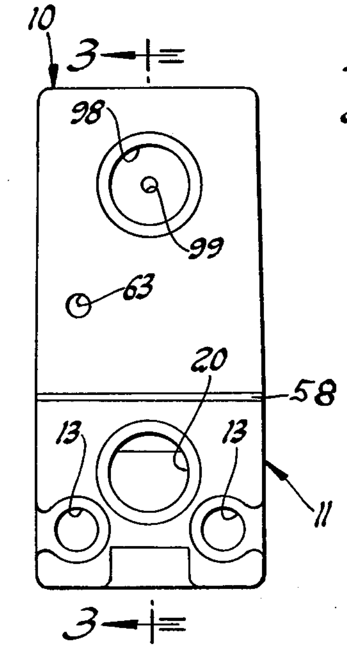
FIG. 2 is a front elevation view of the remote air operator illustrated in FIG. 1, taken along the line 2—2 thereof, and looking in the direction of the arrows.
Figure 3:
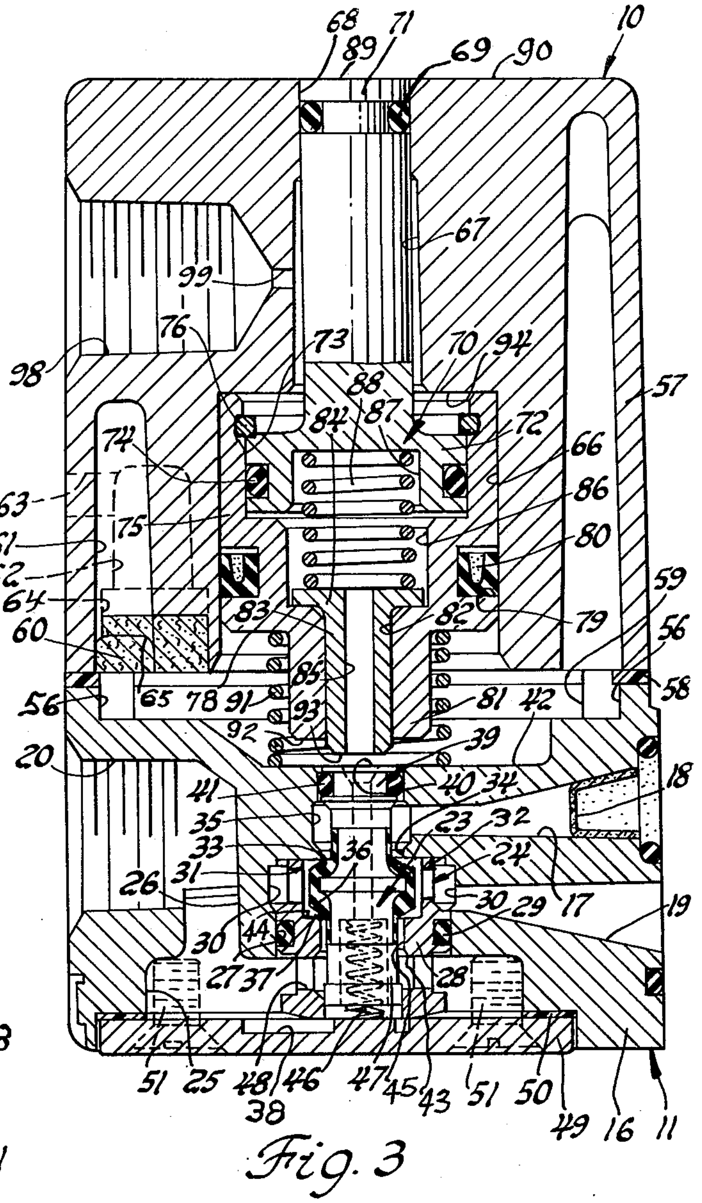
FIG. 3 is an enlarged, elevation section view of the remote air operator structure illustrated in FIG. 2, taken along the line 3—3 thereof, and looking in the direction of the arrows.

Referring now to the drawings, and in particular to FIGS. 2 and 3, the numeral 10 generally designates an illustrative embodiment of a remote air operator made in accordance with the principles of the present invention. The numeral 11 generally designates an air valve which is operated by the remote air operator 10 as, for example, a pilot air valve and the like. The remote air operator 10 is releasably secured to the valve 11 by means of suitable machine screws 12, as shown in FIG. 1. The valve 11 is illustrated as being a pilot air valve for controlling a fluid flow directional control valve, such as a four-way valve, a three-way valve, a two-way valve, or the like. As shown in FIG. 2, the valve 11 is provided with mounting holes 13 for mounting the valve 11 to a valve which it is to control, by suitable mounting bolts.

The illustrated pilot valve shown in FIG. 3 is substantially similar to the three-way, normally closed pilot valve shown and described in U.S. Pat. No. 4,298,027. As shown in FIG. 3, the illustrated pilot valve 11 includes a valve body 16 which is provided with a pilot air inlet passage 17 which would be connected to a suitable source of pressurized air as, for example, a separate external source or a source from the valve which it is to control so that it would be supplied with main line pressurized air from the same source used to supply line pressure to the controlled valve. The pilot air inlet passage 17 is provided with a suitable filter screen 18. The valve body 16 is also provided with a cylinder or outlet passage 19, and an exhaust port 20.

As shown in FIG. 3, the pilot valve 11 includes a tubular spool valve retainer, generally indicated by the numeral 24, in which is operatively mounted a poppet valve spool, generally indicated by the numeral 23. The valve retainer 24 is mounted in place in the lower end of the valve body 16 in an axial bore 27. A lower portion of the poppet valve spool 23 is movably mounted in the valve retainer 24, and the upper end of the poppet valve spool 23 is operatively mounted in a communicating reduced diameter bore 34. The valve retainer bore 27 communicates with an exhaust chamber 25 in the lower end of the valve body 16. The exhaust port 20 communicates with the exhaust chamber 25 through an exhaust passage 26. The lower end of the exhaust chamber 25 is enclosed by a lower bottom end cover 49 which is releasably secured to the valve body 16 by any suitable means, as by a plurality of suitable machine screws 51. A suitable gasket 50 is mounted between the lower end of the valve body 16 and the inner surface of the cover 49. The lower end 28 of the valve retainer 24 is provided with an O-ring seal 29 which is seated in an annular groove formed around the valve retainer body portion 28, and it sealingly engages the valve body bore 27. The upper end of the valve retainer 24 is indicated by the numeral 32, and it comprises a cylindrical wall which seats against the shoulder formed by the junction of the bore 27 and the bore 34 in the valve body 16. The junction point of the last mentioned shoulder and the bore 34 forms a circular, sharp-edged valve seat 33 against which the upper conical peripheral valve element of the annular valve member 36 seats when the poppet valve spool 23 is in the initial, normally closed, inoperative position shown in FIG. 3.

When the poppet valve spool 23 is in the initial, inoperative position of FIG. 3, the cylinder passage 19 is connected to the exhaust port 20 through an enlarged diameter bore 30 in the bore 27 in the valve body 16. The bore 30 communicates with a plurality of radial ports 31 that extend through the valve retainer upper portion 32. The radial ports 31 communicate on their inner end with an enlarged diameter bore 44 which is formed in the valve retainer 24, in the upper end thereof. The bore 44 communicates with a reduced diameter axial bore 45 that communicates at its lower end with a radial bore 43 and arcuate slots 48. The passageways 48 communicate with the exhaust chamber 25 and passage 26 which communicates with the exhaust port 20.

When the poppet valve spool 23 is moved downwardly to the operative position, the lower conical peripheral valve element of the annular valve member 36 seats against a circular, sharp-edged valve seat 37 which is formed by the junction of the enlarged diameter bore 44 and the smaller diameter bore 45 in the valve retainer 24. When the poppet valve spool 23 is in the last described operative position, the aforedescribed connection between the cylinder port 19 and the exhaust port 20 is closed, and the inlet passage 17 is connected to the cylinder passage 19 by the following described passageway. The inlet passage 17 communicates at its inner end with an enlarged bore 35 which is formed in the valve body bore 34. The enlarged bore 35 communicates with the bore 34 and with the enlarged bore 44 in the valve retainer 24. The passageway from the inlet passage 17 to the cylinder passage 19 is then completed through the plurality of radial ports 31 in the valve retainer upper end portion 32, and thence through the enlarged bore 30 and into the passage 19. The poppet valve spool 23 is provided on the upper end thereof with an O-ring 41 which is mounted in a groove around the upper end 39 of the poppet valve spool 23, and it sealingly engages the upper end of the bore 34. The upper transverse end of the poppet valve spool 23, which is engageable by the hereinafter described operator, is indicated by the numeral 40.

The poppet valve spool 23 is biased to the upper, normally closed, inoperative position shown in FIG. 3 by a return spring 46 which is operatively mounted in an axial bore 47 in the lower end of the poppet valve spool 23. The lower end of the spring 46 seats on the inner surface of the cover 49, and its inner end abuts the inner end wall of the bore 47. The exhaust chamber 25 communicates through passage 38 in the inner face of the plate 49 to allow the exhaust air to get under the lower end of the poppet valve spool 23 and provide an air assist to the return spring 46 during an exhaust operation.

As shown in FIG. 3, the remote air operator 10 is mounted on the top end of the valve body 16, and it has an axially disposed operator shaft 81, and a concentric push pin 83 which extend downwardly into the chambers 42 and 59 that are formed in the upper end of the valve body 16, and which communicate with the poppet valve spool bore 34 and the upper end 40 of the poppet valve spool 23. The remote air operator 10 includes a housing 57 which is seated on a suitable gasket 58 between the lower end thereof and the upper end of the valve body 16. The chamber 42 in the valve body 16 communicates through passage 56 and the chamber 59, and through passages 64, 65, 61 and 62, with a vent 63, to vent any air in the last described chambers and passageways to the atmosphere. A filter element 60 is mounted in the passage 64.

As shown in FIG. 3, the remote air operator 10 includes an axially disposed piston cylinder or chamber 66 which is formed in the lower end thereof and extends inwardly or upwardly, as viewed in FIG. 3, to an end wall designated by the numeral 94. A reduced diameter axial bore 67 is formed in the upper end of the remote air operator body 57, and the lower end thereof communicates with the upper end of the piston cylinder 66, and the upper end thereof communicates with a still further reduced bore 68 which extends to the exterior of the upper end of the operator body 57.

An operator means, generally indicated by the numeral 70, is movably mounted in the bores 67 and 68, and the piston cylinder 66. A manual operator member 71, in the form of a cylindrical push rod, is slidably mounted in the bore 68, and it extends inwardly or downwardly, as viewed in FIG. 3, through the bore 67 and into the piston cylinder 66. A suitable O-ring 69 is operatively mounted in a groove around the upper end of the manual operator rod 71, and it sealingly engages the surface of the bore 68. The upper or outer end 89 of the manual operator rod 71 is disposed in the same plane as the upper end 90 of the operator body 57 when the operator means 70 is in the inoperative, upward position shown in FIG. 3.

As shown in FIG. 3, the remote air operator 10 includes a manual operator piston 72 which is integral with the lower or inner end of the manual operator rod 71. The manual operator piston 72 is movably mounted in a piston cylinder 73 which is formed in the upper end of the remote operator piston 75. The manual operator piston 72 is provided with a suitable O-ring 74 that is mounted in a groove around the piston 72, and which sealingly engages the inner wall surface of the piston cylinder 73. The manual operator piston 72 is releasably retained in the piston cylinder 73 by a suitable retainer ring 76. As shown in FIG. 3, the remote operator piston 75 is provided with a suitable seal member 80, which is mounted in a groove 79 formed in the outer surface of the piston 75. The operator shaft 81 is integrally formed on the operator piston 75, and it extends downwardly from the lower end 78 of the piston 75. As shown in FIG. 3, the remote operator piston shaft 81 is axially extended from the operator piston 75, and it is provided with an axial bore 82 which is open at the lower end thereof. The axial bore 82 communicates at its upper end with an enlarged axial bore 86 that is formed in the operator piston 75. The bore 86 in the operator piston 75 communicates at its upper end with an enlarged diameter bore 73 that is formed in the upper end of the operator piston 75. The bore 86 in the operator piston 75 is aligned with an axial bore 87 that is formed in the lower end of the manual operator piston 72, and which extends inwardly or upwardly in the piston 72.

As shown in FIG. 3, the tubular push pin, or overtravel bushing 83, is slidably mounted in an axial bore 82 in the remote operator piston shaft 81, and it is provided with a transverse flange 84 on the upper end thereof which is seated in the bore 86, on the shoulder formed by the junction of the bores 82 and 86, in the operator shaft 81 and operator piston 75, respectively. The tubular push pin 83 is provided with an axial bore 85 which extends therethrough and which is open on the lower end thereof and communicates at its upper end with the enlarged bore 86 in the remote operator piston 75. A coil bias spring 88 is operatively mounted in the bores 86 and 87. The lower end of the bias spring 88 is seated on the upper side of the push pin flange or head 84, and the upper end of the spring 88 is seated against the upper end wall of the bore 87 in the manual operator piston 72. As shown in FIG. 3, the bias spring 88 normally maintains the push pin 83 in the downward position with the flange 84 seated on the inner end wall of the bore 86, and with the manual operator piston 72 moved upward against the lower side of the retainer ring 76.

As shown in FIG. 3, a return spring 91 is operatively mounted around the remote or operator piston shaft 81, with the lower end thereof seated on the inner wall of the chamber 42, in a position concentric with the upper end 40 of the valve spool 23. The upper end of the return spring 91 is seated against the lower end of shoulder 78 on the bottom end of the remote operator piston 72. The lower end 93 of the push pin 83 extends below the lower end 92 of the remote operator shaft 81, and it is adapted to engage the upper end 40 of the valve spool 23, when the operator means 70 is energized, for moving the valve spool 23 downwardly against the pressure of the return spring 46, as more fully described hereinafter. As shown in FIG. 3, the remote air operator 10 is provided with a threaded inlet port 98, which would be operatively connected by suitable air conduits, for conducting a pressurized air signal from a remote control valve, such as a hand operated valve, a palm button valve, a time valve, a limit switch valve, and the like. The pressurized air inlet port 98 is connected by a passage 99 to the enlarged bore 67.

In use, assuming that the valve 10 is a pilot air valve, for controlling the flow of pilot air to a fluid flow directional control valve, the valve spool 23 would be normally biased by the return spring 46 to the upward inoperative position shown in FIG. 3, to block the pressurized pilot air entering the passage 17 and to connect the cylinder passage 19 to the exhaust port 20. When an air pressure signal is admitted into the inlet port 98 in the remote air operator body 57, said signal is conveyed through the passage 99 into the enlarged bore 67 and thence downwardly against the upper side of the remote operator piston 75 to move the same downwardly. During the downward movement of the remote operator piston 75, the lower end 93 of the push pin 83 engages the upper outer end 40 of the valve spool under portion 39, and moves the valve spool 23 downwardly against the pressure of the return spring 46. The push pin 83 moves the valve spool 23 downwardly to seat the annular valve element 36 on the lower valve seat 37 and close the cylinder passage 19 from the exhaust port 20, and connect the cylinder passage 19 to the pilot air inlet passage 17. It will be seen that the push pin 83 is slidably mounted in the bore 82 in the remote operator piston shaft 81 so that when the lower end 93 of the push pin 83 engages the upper end 40 of the valve spool 23, it will permit continued downward movement of the piston shaft 81 until it bottoms out on the inner wall of the chamber 42. The push pin 83 is maintained in operative engagement with the upper end 40 of the valve spool 23 during the last described action by the overtravel spring 88, which abuts the flange 84 on the push pin 83, but which permits upward movement of the push pin 83 relative to the piston shaft 81 so that the annular valve element 36, when it seats on the lower valve seat 37, does not have to absorb the total force of the air pressure signal against the remote operator piston 75.

When the remote air pressure signal is removed, the spring 91 functions to return the remote operator piston 75 to the upward, initial inoperative position shown in FIG. 3. Any air pressure in the chambers 42 and 59 is exhausted to the atmosphere through the bores 56, and the passages 61, 62, 64 and 63.

When it is desired to manually operate the valve spool 23 downwardly, the operator exerts a downward manual force on the outer end 89 of the indicator operator rod 71. The downward pressure on the operator rod 71 moves the manual operator piston 72 downwardly against the pressure of spring 88 until piston 72 bottoms out against the inner end wall of the piston cylinder 73 in the piston 75. Continued downward movement of the manual operator rod 71 moves the piston 75 downwardly to carry out the aforedescribed downward movement of the valve spool 23, as effected by the previously described air pressure signal. When the pressure on the manual operator rod 71 is released, the return spring 91 again moves the pistons 75 and 72 upwardly to the initial inoperative position shown in FIG. 3. It will be seen that an operator can see when the upper end of the indicator operator rod 71 is moved inwardly in the bore 83, to indicate that a remote air signal has effected operation of the operator 10 on the valve 11.

INDUSTRIAL APPLICABILITY

The remote air operator, with the manual override and indicator, is adapted for use in industrial air use applications. The remote air operator can be used to operate pilot air valves or other types of air valves where it is desired to control a valve by pilot air.

I claim:

1. In an air valve, the combination including, a valve body having a valve spool bore in which is operatively mounted a valve spool for controlling the flow of fluid through passages in the valve body, and wherein the valve spool is moved to a first flow control position by an operator biasing means engageable with a first end of the valve spool, and wherein the valve spool has a second end that is positioned at an end of the valve spool bore that is open at one side of the valve body, and the valve spool is movable to a second flow control position by a remote air operator means, characterized in that the remote air operator means includes:

(a) an operator body having one end attached to said one side of the valve body over said open end of the valve spool and the second end of the valve spool bore in the valve body;

(b) a remote operator piston cylinder formed in the operator body, and extended axially inward thereof from said one end that is attached to said valve body, and having an inner end wall;

(c) a remote operator piston, having an upper end and a lower end, and being slidably mounted in said piston cylinder and moveable between an inoperative position and an operative position;

(d) a push pin carried by said remote operator piston and engageable directly with said second end of the valve spool to move the valve spool from said first flow control position to said second flow control position when the remote operator piston is moved from the inoperative position to the operative position;

(e) biasing means engageable with said remote operator piston for normally biasing said remote operator piston to the inoperative position;

(f) air passage means in said operator body and communicating at one end with the inner end of the piston cylinder and communicating at the other end with a remote air pressure signal inlet port, whereby when an air pressure signal is conducted from a remote location to the air pressure signal inlet port, said air pressure is transmitted through said air passage means into the piston cylinder where it moves the remote operator piston from said inoperative position to said operative position, whereby the valve spool is directly engaged by the push pin to move the valve spool from said first flow control position to second flow control position, and when the air pressure signal is terminated, said biasing means will return the remote operator piston to the inoperative position;

(g) said push pin is slidably mounted in an axial bore in said remote operator piston and it has one end normally extended outwardly below the lower end of the remote operator piston and engageable directly with said second end of the valve spool; and, (h) an overtravel spring operatively mounted in an axial bore in said remote operator piston and having one end engageable with the other end of the push pin to normally restrain movement of the push pin relative to the remote operator piston but permit the remote operator piston to continue movement toward the valve body, after the valve spool has been seated in said second flow control position, so that the valve spool does not absorb the total force of the air pressure signal against the remote operator piston.

2. The combination in an air valve as defined in claim 1, characterized in that:

(a) said remote operator piston biasing means comprises a spring means.

3. The combination in an air valve as defined in claim 2, characterized in that:

(a) said spring means is operatively mounted between the remote operator piston and said one side of the valve body on which the remote air operator is mounted.

4. The combination in an air valve as defined in claim 1, characterized in that:

(a) the one end of the operator body attached to the valve body is provided with vent passages to vent the space between the operator body and valve body to the atmosphere.

5. The combination in an air valve as defined in claim 1, characterized in that:

(a) a manual operator piston is movably mounted in the overtravel spring axial bore in the remote operator piston and it is engageable with the other end of the overtravel spring;

(b) retainer means restricts outward movement of the manual operator piston in the overtravel spring axial bore; and, (c) a manual, indicator, operator rod is slidably mounted in an axial bore in the operator body and it is connected to said manual operator piston for manually moving said push pin to move said valve spool from said first flow control position to said second flow control position.

* * * * *

UNITED STATES PATENT OFFICE

CERTIFICATE OF CORRECTION

Patent No. 4,453,697 Dated June 12, 1984

Inventor(s) James A. Neff

It is certified that error appears in the above-identified patent and that said Letters Patent are hereby corrected as shown below:

Column 5, line 38, "under" should be --upper--.

Signed and Sealed this

*Twenty-fifth* Day of *September 1984*

[SEAL]

*Attest:*

GERALD J. MOSSINGHOFF

*Attesting Officer* *Commissioner of Patents and Trademarks*